US009848723B1

(12) United States Patent
Huang

(10) Patent No.: US 9,848,723 B1
(45) Date of Patent: Dec. 26, 2017

(54) REVERSIBLE MAKEUP BRUSH HOLDER

(71) Applicant: ACTMAN CORP., Taipei Hsien (TW)

(72) Inventor: Chu Chau Huang, Taipei Hsien (TW)

(73) Assignee: Actman Corp., Taipei Hsien (TW)

( * ) Notice: Subject to any disclaimer, the term of this patent is extended or adjusted under 35 U.S.C. 154(b) by 0 days.

(21) Appl. No.: 15/387,988

(22) Filed: Dec. 22, 2016

(51) Int. Cl.
*A47G 29/08* (2006.01)
*A46B 17/08* (2006.01)
*F16M 11/16* (2006.01)

(52) U.S. Cl.
CPC .............. *A47G 29/08* (2013.01); *A46B 17/08* (2013.01); *F16M 11/16* (2013.01)

(58) Field of Classification Search
CPC ........ A47G 29/08; A46B 17/08; A46B 17/02; A46B 2200/202; F16M 11/16; B44D 3/125; B44D 3/123; B44D 3/127
See application file for complete search history.

(56) References Cited

U.S. PATENT DOCUMENTS 83,341 A * 10/1868 Towndrow ......... A47G 19/2255 215/377
970,046 A * 9/1910 Hampton .................. A47F 5/02 211/70
5,137,319 A * 8/1992 Sauder ................... A01K 97/10 206/315.11
5,577,344 A * 11/1996 Zaremba ................ A47G 7/041 108/150
5,966,868 A * 10/1999 Cox ..................... A01K 45/002 119/69.5
6,123,206 A * 9/2000 Zaremba ................ A47B 57/26 108/147.13
8,074,814 B2 * 12/2011 Morris ..................... A47K 1/09 206/362.1
8,720,703 B1 * 5/2014 Pressler ................. A46B 17/02 211/1.3
8,985,351 B1 * 3/2015 Longo ................... A47F 3/0404 211/13.1
9,067,462 B1 * 6/2015 Pressler ................. A46B 17/02

* cited by examiner

*Primary Examiner* — Ko Hung Chan
(74) *Attorney, Agent, or Firm* — Rosenberg, Klein & Lee

(57) ABSTRACT

A reversible makeup brush holder includes a base body for receiving water. The middle of the base body is connected with a support part. The insertion seat includes a disc body having an accommodation hole. Upper and lower surfaces of the disc body are provided with a rotary shaft, respectively. The rotary shaft is pivoted to the support part. Through the aforesaid design, a makeup brush can be inserted into the insertion hole. The insertion seat can be lifted and overturned, so that the water remaining in the bristles of the makeup brush can drip down rapidly on the base body. The user can clean the makeup brush holder conveniently.

26 Claims, 10 Drawing Sheets

REVERSIBLE MAKEUP BRUSH HOLDER

FIELD OF THE INVENTION

The present invention relates to a reversible makeup brush holder, and more particularly to a holder for placement of makeup brushes after cleaning.

BACKGROUND OF THE INVENTION

In addition to essential cleaning products, cosmetics (or makeup products) are used to enhance the appearance of the human body. In general, the purpose of the cosmetics is to make the user more attractive. For most women, the use of cosmetics enables the user to appear more healthy and young. Foundation is used to smooth the user's skin in a flawless ideal state. Eye shadow, eyeliner and mascara make the eyes look bigger, younger, and more innocent. Blush makes the user's face blush as a young person feels excited. Lipstick is used to make the lips look bigger, so that flaws can be covered and the user looks younger. The main tool for the use of cosmetics is makeup brushes. For different cosmetics, a variety of brushes are required. For example, a fan brush is used to sweep excess powders on the face, which is the largest one of the makeup brushes. A repair brush (silhouette brush) is used to brush shadow for repairing the facial contours. A blush brush is used to brush blush. The blush brush and the repair brush are separate to avoid color mixing. A foundation brush is used to brush liquid foundation so that the foundation can be applied evenly. An eye shadow stick is used to describe the color of thick eye shadow. An eyelash brush is used to repair eyelashes or eyebrows. An eyebrow brush is used to paint eyebrows with eyebrow powders. A lip brush is used for lipstick and other lipstick cosmetics. With the use of makeup brushes, the daily cleaning and maintenance is not negligible so as to prolong the service life of the makeup brushes. Makeup brushes directly influence the makeup result, whether the makeup color is uniform and fine. If the makeup brushes are not clean, they are likely to cause a large number of bacteria breeding, endangering the health of the skin. In general, the makeup brushes are washed with warm soapy water or shampoo and then cleaned with cold water. Finally, a facial tissue is used to absorb the moisture, and then the makeup brushes are placed on a dry towel for drying. In order for the makeup brushes to have a better placement space, the industry has developed a fixed makeup brush holder. The holder includes a cross-shaped support frame and an insertion disc. The insertion disc has a plurality of insertion holes. The middle of the insertion disc is formed with a cross-shaped slot for insertion of the cross-shaped support frame. The plurality of insertion holes is coupled with an elastic sheet. The elastic sheet is formed with insertion slots for insertion of makeup brushes. However, the makeup brush holder has the following drawbacks when in use.

1. The support frame and the insertion disc are fixed. The insertion disc cannot be rotated for the user to select a desired makeup brush.

2. After the makeup brushes are cleaned, they are inserted on the holder and the brush bristles are placed to face up. As a result, the residual water in the bristles cannot be fully discharged to result in a large number of bacteria breeding, and the brush bristles may be deformed and damaged easily.

3. If the residual water in the bristles is too much, it will flow down along the brush handle to stain the brush handle and the holder.

In order to ameliorate the above deficiencies, Chinese Patent Publication No. CN 105640015 A discloses a rotary brush holder. The rotary brush holder comprises a rotary base, a support rod fixed to the rotary base, a rotary wheel connected to the top end of the support rod, and a brush disc fixed to the rotary wheel. The brush disc is provided with a silicone sheet having openings. In this technical scheme, the brush disc can be turned 360 degrees horizontally for convenient access. The rotary wheel can be turned 180 degrees axially. After the brushes are inserted on the brush disc, the brush disc can be turned 180 degrees for drying. After drying, the brush disc is turned 180 degrees for use. However, the base of the rotary brush holder does not have a member to receive the water remaining in the brush. Therefore, the water is liable to contaminate the tabletop, and the complicated rotary mechanism causes inconvenience in assembly and an increase of the cost. In addition, U.S. Design No. D764709 discloses a makeup brush holder for placement of makeup brushes, which also has the shortcomings as described above.

Accordingly, the inventor of the present invention has devoted himself based on his many years of practical experiences to solve these problems.

SUMMARY OF THE INVENTION

In view of the shortcomings of the conventional makeup brush holder, namely, complex structure, high cost, and not having a complete storage space, the makeup brush holder could be improved.

The primary object of the present invention is to provide a reversible makeup brush holder which includes a base body having a support post and a reversible insertion seat for a makeup brush to be placed reversely after cleaning so that the water remaining in the bristles of the makeup brush can drip down rapidly.

Another object of the present invention is to provide a reversible makeup brush holder which includes a concave base body for the water remaining in the bristles of the makeup brush to flow to the base body so that the user can clean the makeup brush holder conveniently.

In order to achieve the aforesaid object, the reversible makeup brush holder of the present invention comprises a base and an insertion seat. The base has a base body for receiving water and a support part located at a middle portion of the base body. The insertion seat includes a disc body. The disc body has at least one insertion hole. The insertion hole is coupled with an elastic sheet having at least one insertion slot. Upper and lower surfaces of the disc body are provided with a rotary shaft, respectively. The rotary shaft is pivoted to the support part so that the insertion seat is rotatable on the support part.

Thereby, after the makeup brush is washed, the brush handle can be inserted into the insertion slot inside the insertion hole, and the brush handle is held on the insertion seat through the holding force of the elastic sheet. After that, the insertion seat is lifted and turned 180 degrees, and the rotary shaft of the insertion seat is pivoted to the support part, enabling the brush bristles of the makeup brush to face down. The water remaining in the brush bristles may drip on the concave base body. When the user wants to use the makeup brush, the insertion seat is lifted and turned 180 degrees, and the rotary shaft is pivoted to the support part. The insertion seat can be rotated 360 degrees horizontally for the user to select a desired makeup brush. Furthermore, the insertion holes are arranged in a staggered manner, such that a large-sized makeup brush may be placed close to the center of the insertion seat and a small-sized makeup brush may be placed close to the outer edge of the insertion seat, facilitating the user to take the makeup brush for use without interference.

DETAILED DESCRIPTION OF THE PREFERRED EMBODIMENTS

Embodiments of the present invention will now be described, by way of example only, with reference to the accompanying drawings.

Figure 1:
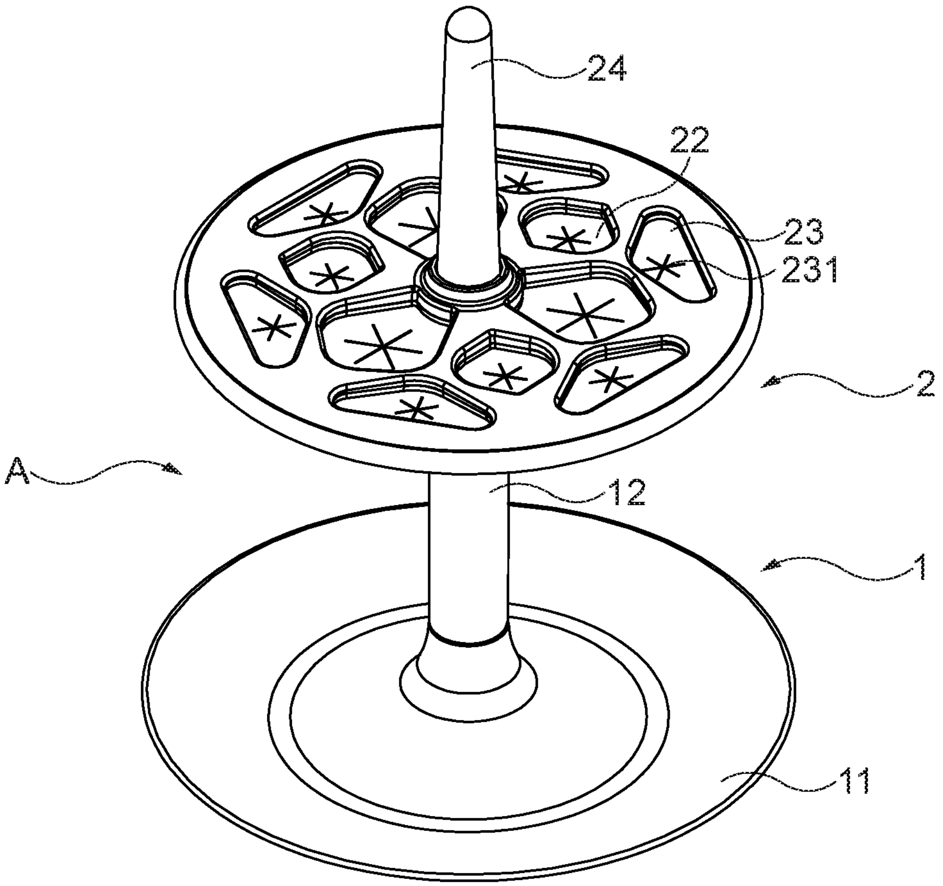
FIG. 1 is a perspective view of the present invention.
Figure 2:
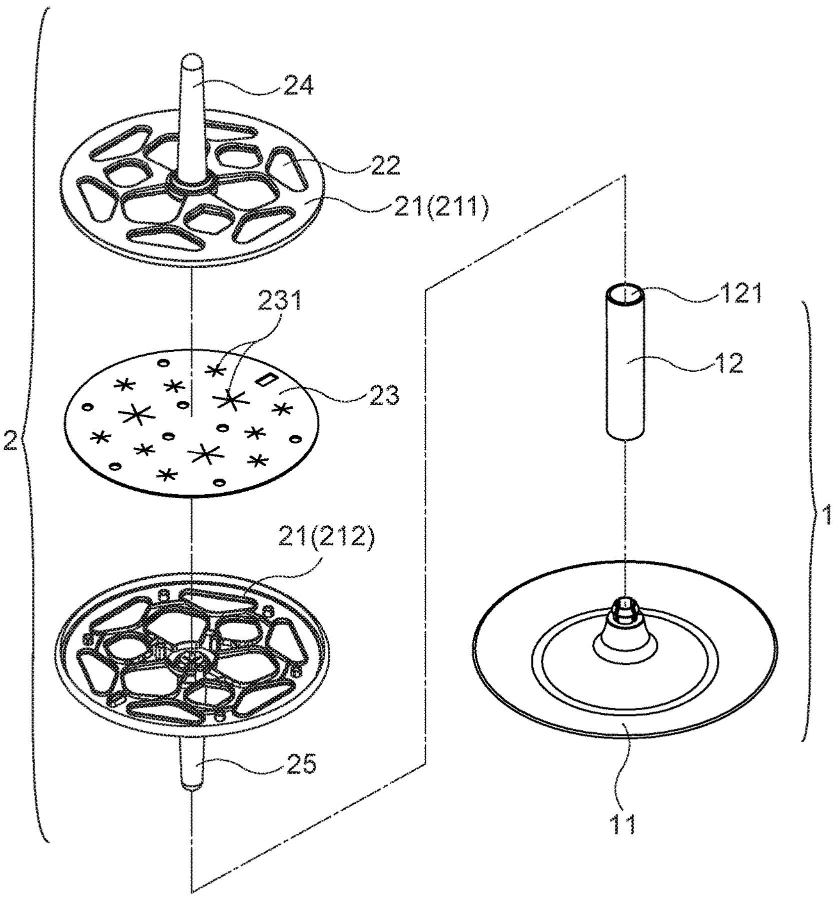
FIG. 2 is an exploded view of the present invention.
Figure 3:
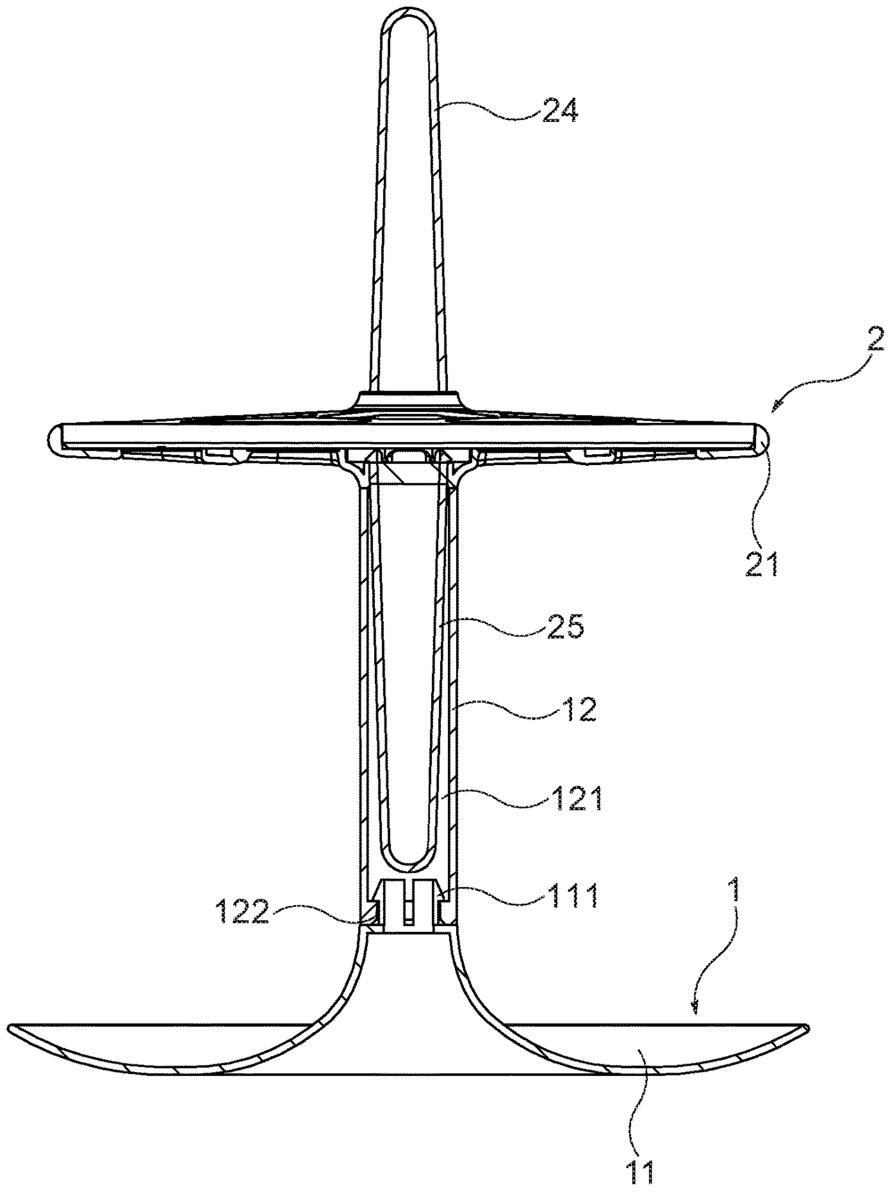
FIG. 3 is a sectional view of the present invention.

Referring to FIG. 1 through FIG. 3, a reversible makeup brush holder A of the present invention comprises a base 1 and an insertion seat 2. The base 1 has a base body 11 for receiving water. The middle of the base body 11 is provided with a support part 12 having an accommodation hole 121. In an embodiment of the present invention, the support part 12 is integrally formed with the base body 11. In another embodiment of the present invention, an end of the support part 12 has an engaging recess 122, and the base body 11 is provided with an engaging block 111. The engaging recess 122 of the support part 12 is engaged with the engaging block 111 of the base body 11. The insertion seat 2 includes a disc body 21. The disc body 21 is composed of an upper disc 211 and a lower disc 212. The disc body 21 has at least one insertion hole 22. An elastic sheet 23 having at least one insertion slot 231 is provided between the upper disc 211 and the lower disc 212. In an embodiment of the present invention, the elastic sheet 23 is made of a silicone material. The surfaces of the upper disc 211 and the lower disc 212 are connected with a first rotary shaft 24 and a second rotary shaft 25, respectively. The rotary shafts 24, 25 can be inserted into the accommodation hole 121 of the support part 12.

Figure 4:
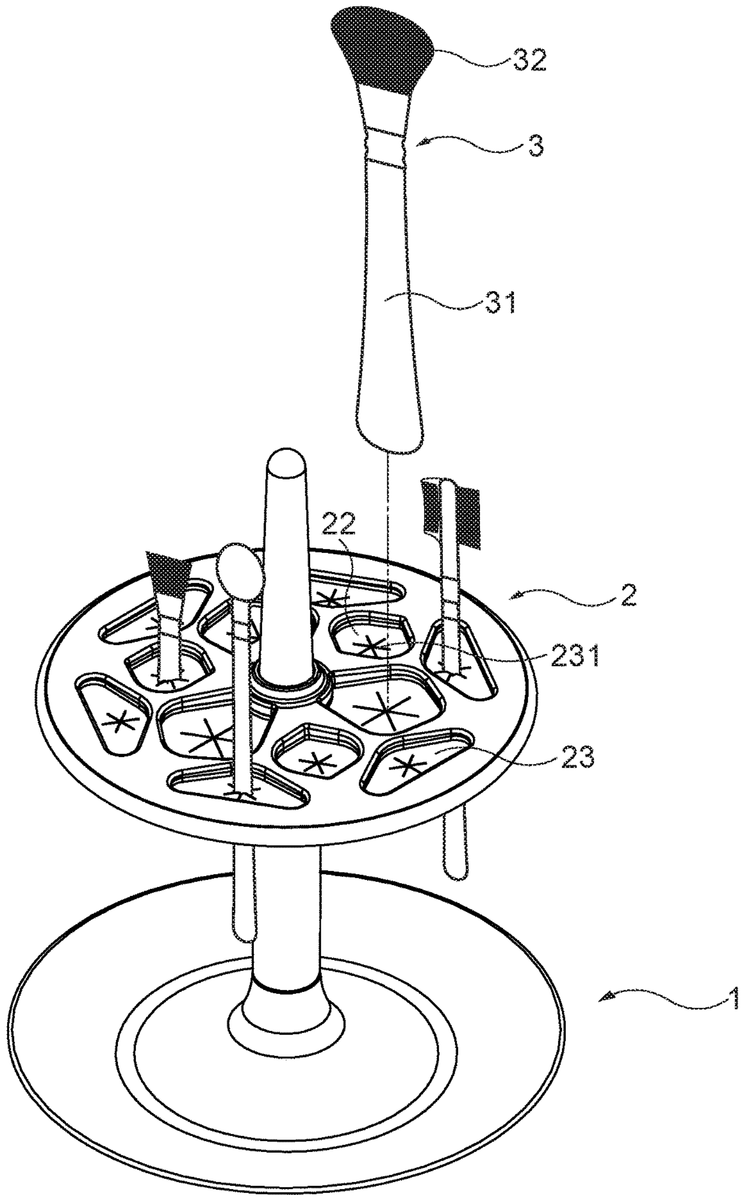
FIGS. 4-8 are schematic views of the present invention when in use.
Figure 5:
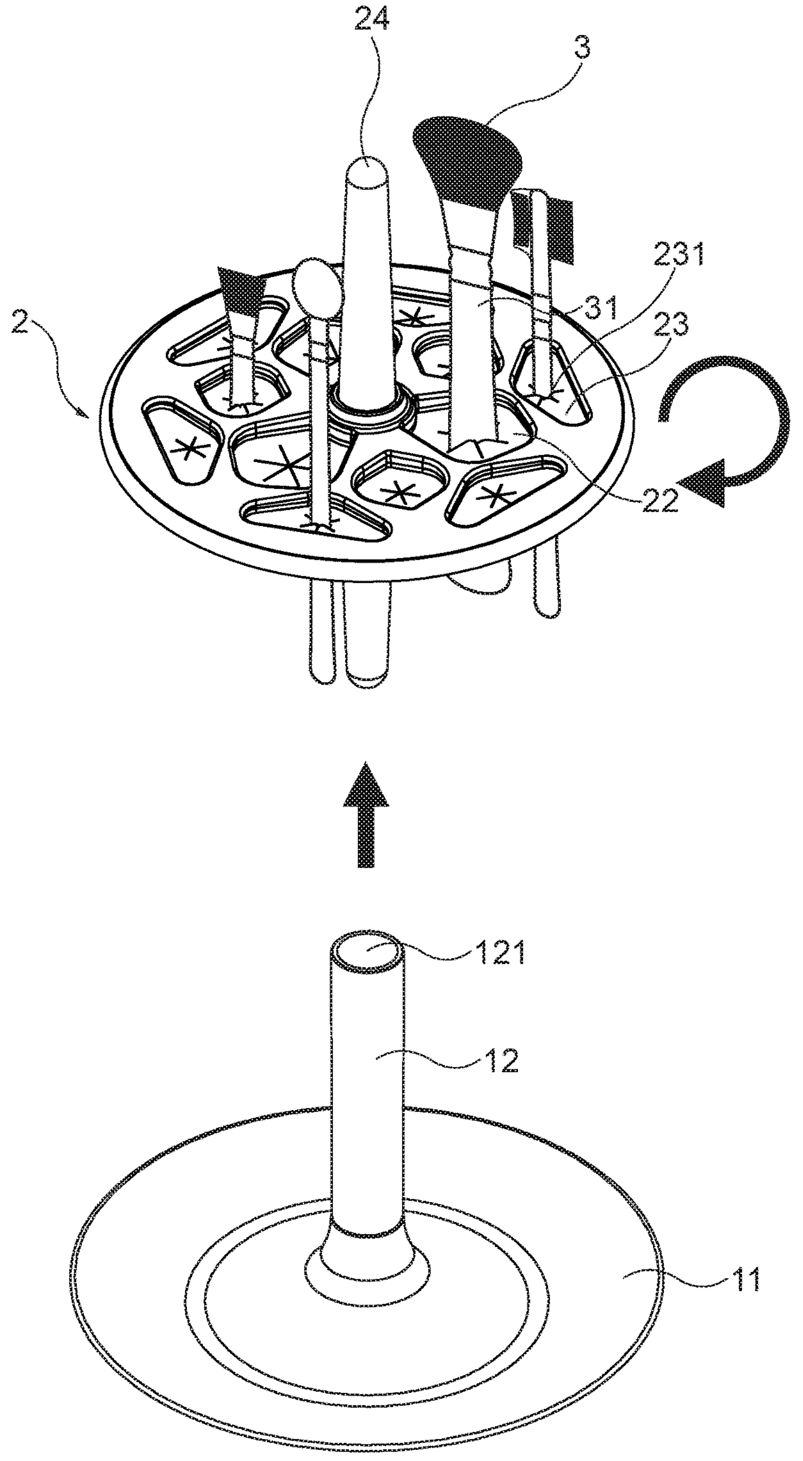
Figure 6:
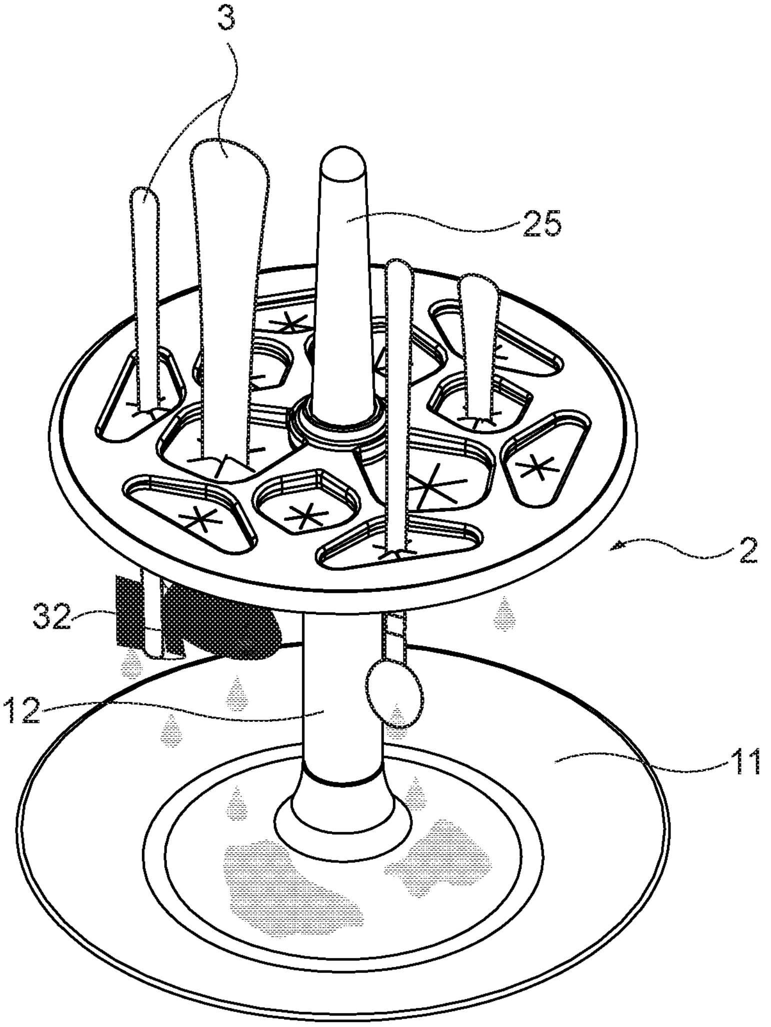
Figure 7:
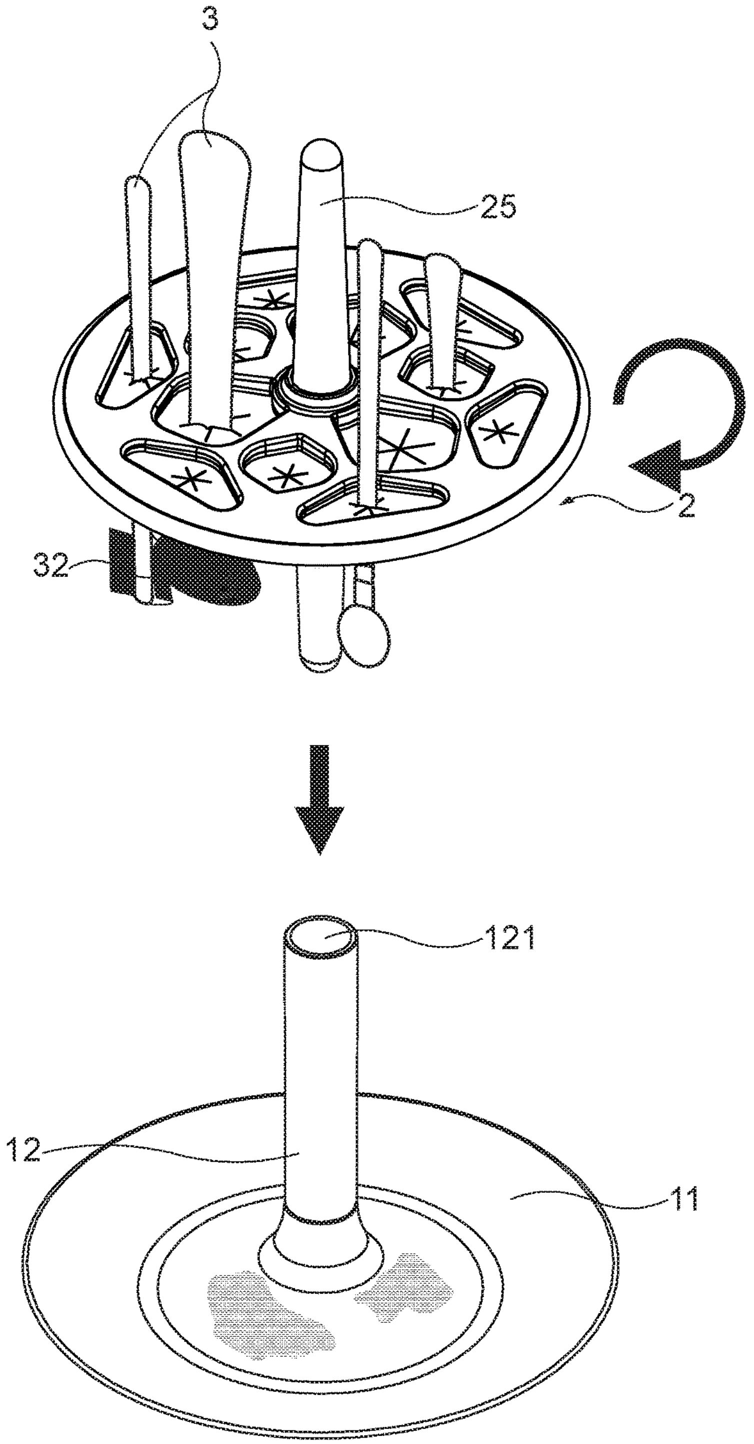
Figure 8:
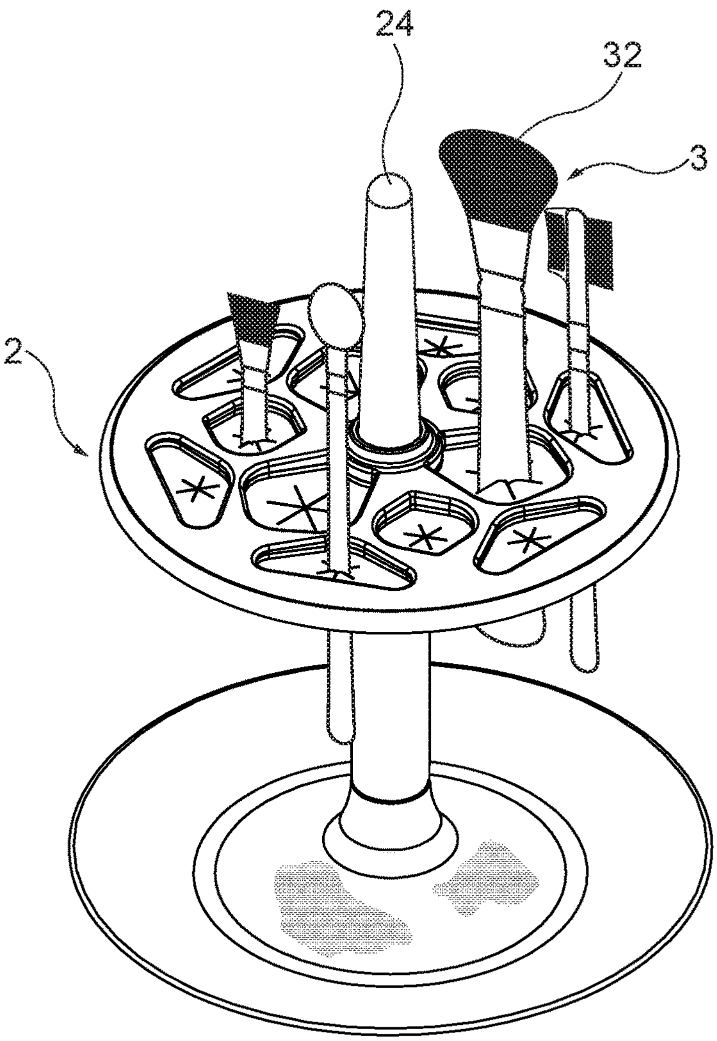

Referring to FIG. 4, after a makeup brush 3 is washed, a brush handle 31 of the makeup brush 3 can be inserted into the insertion slot 231 inside the insertion hole 22 of the disc body 21, and the brush handle 31 is held on the insertion seat 2 through the holding force of the elastic sheet 23. After that, the entire insertion seat 2 is lifted and turned 180 degrees (referring to FIG. 5), and the first rotary shaft 24 is inserted into the accommodating hole 121 of the support part 12 of the base body 11, enabling brush bristles 32 of the makeup brush 3 to face down (as shown in FIG. 6). At this time, the water remaining in the brush bristles 32 may drip on the concave base body 11. When the user wants to use the makeup brush 3, the insertion seat 2 is lifted and turned 180 degrees vertically (as shown in FIG. 7), and the second rotary shaft 25 is inserted into the accommodating hole 121 of the support part 12 of the base body 11, enabling the brush bristles 32 to face up (as shown in FIG. 8). The insertion seat 2 can be rotated 360 degrees horizontally for the user to select a desired makeup brush 3.

Figure 9:
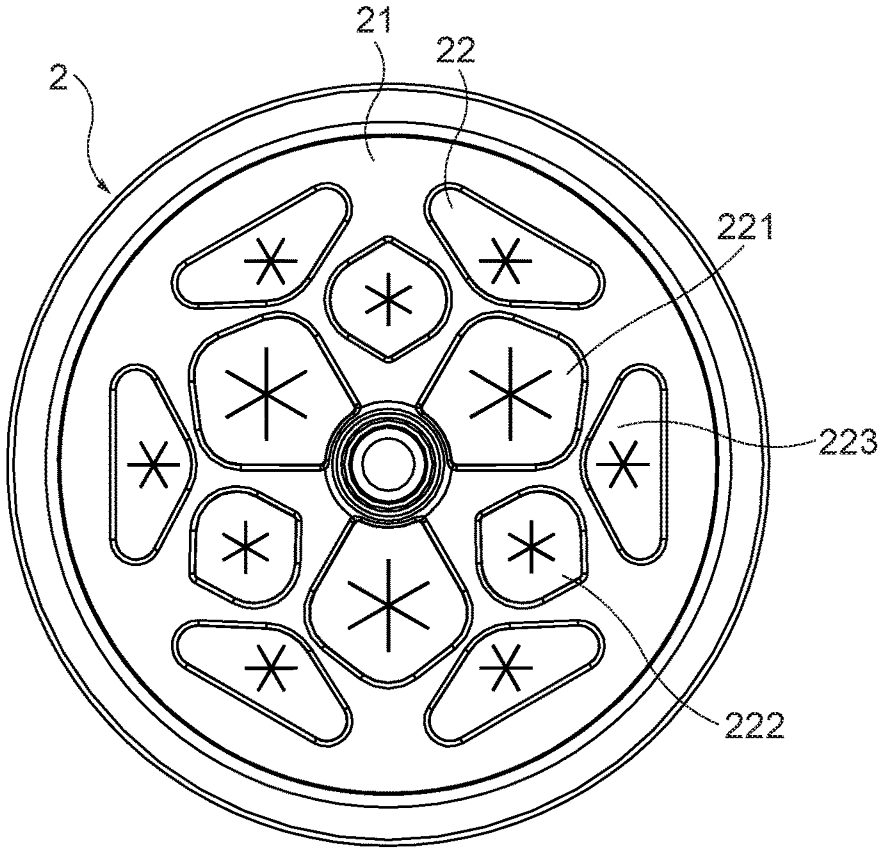
FIG. 9 is a schematic view showing the arrangement of the insertion holes of the present invention.

Referring to FIG. 9, the insertion holes 22 of the disc body 21 is arranged in a staggered manner. Large insertion holes 221 are disposed close to the center of the insertion seat 2 for insertion of large-sized makeup brushes 3 (not shown in the drawing). The middle of the insertion seat 2 is formed with middle insertion holes 222 for insertion of middle-sized makeup brushes 3. Small insertion holes 223 are disposed close to the outer edge of the insertion seat 2 for insertion of small-sized makeup brushes 3. The staggered design allows the user to have a larger space to take a desired makeup brush 3, without hindrance.

Figure 10:
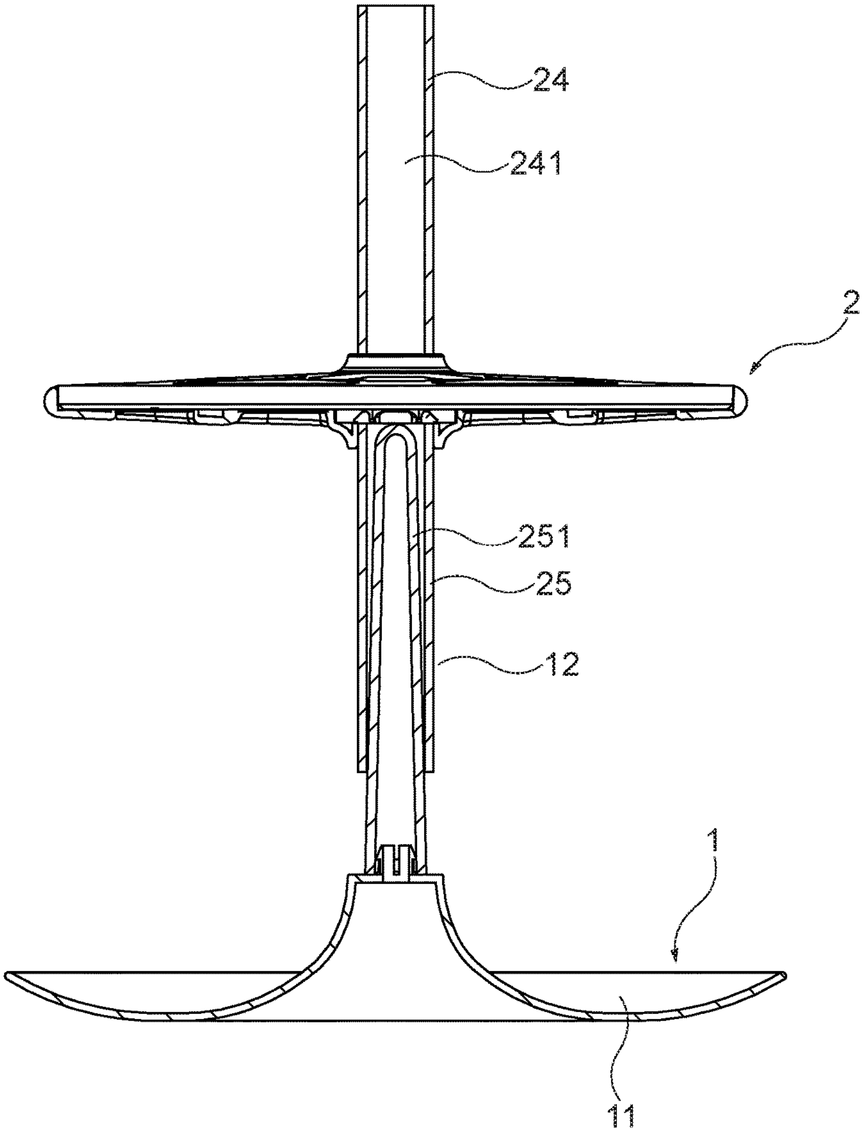
FIG. 10 is a sectional view of another embodiment of the present invention.

Referring to FIG. 10, in a further embodiment of the present invention, a support part 12 is provided at the middle of the base body 11 of the base 1. Each of the first rotary shaft 24 and the second rotary shaft 25 is formed with an accommodation hole 241 (251), so that the accommodation hole 241 (251) of the first rotary shaft 24 and the second rotating shaft 25 can be fitted on the support part 12 of the base body 11. The insertion seat 2 is rotatable on the support part 12.

Through the above-described structure, the present invention has the following advantages:

1. The insertion seat of the makeup brush holder of the present invention is reversible, so that the water will not remain in the brush bristles after the makeup brushes are washed. The brush bristles are not easily damaged and deformed, and the service life of the makeup brush is prolonged. Besides, the makeup brush holder and the brush handle will not be stained due to water backflow.

2. The makeup brush holder of the present invention can reduce the production cost because the insertion seat has a simple structure and provides a reversible function.

3. The base of the makeup brush holder of the present invention has a concave design so that the water remaining in the makeup brush can drip on the base body to avoid a tabletop from being stained so as to facilitate the cleaning.

4. The insertion holes of the insertion seat of the makeup brush holder of the present invention are arranged in a staggered manner, which can facilitate the user to take the makeup brush and reduce the interference.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A reversible makeup brush holder, comprising:

a base, the base having a base body and a support part located at a substantially middle portion of the base body; and an insertion seat detachably coupled to the base, the insertion seat being invertible between an upright position and an inverted position with respect to the base, the insertion seat including a disc body, the disc body having at least one insertion hole and an elastic sheet extending across the insertion hole to form at least one insertion slot for retention of a makeup brush inserted therethrough, a rotary shaft portion projecting axially from each of upper and lower surfaces of the disc body, each of the rotary shaft portions being configured to pivotally engage the support part to be rotatable thereon;

the insertion seat being thereby configured to hold the makeup brush selectively in inverted or upright orientations relative to the support part, allowing the makeup brush to face down towards the base body in the inverted orientation for remaining moisture in the makeup brush to drip on the base body.

2. The reversible makeup brush holder as claimed in claim 1, wherein the support part is integrally formed with the base body.

3. The reversible makeup brush holder as claimed in claim 1, wherein the support part has an accommodation hole for insertion of each of the rotary shaft portions.

4. The reversible makeup brush holder as claimed in claim 1, wherein an upper surface of the base body is formed with a concave contour.

5. The reversible makeup brush holder as claimed in claim 1, wherein the elastic sheet is made of silicone material.

6. The reversible makeup brush holder as claimed in claim 1, wherein the disc body includes a plurality of insertion holes in different sizes and shapes and arranged in a staggered manner.

7. The reversible makeup brush holder as claimed in claim 6, wherein insertion holes having maximum size are disposed close to a center of the insertion seat, and insertion holes having minimum size are disposed close to an outer edge of the insertion seat.

8. The reversible makeup brush holder as claimed in claim 1, wherein the disc body includes an upper disc and a lower disc.

9. The reversible makeup brush holder as claimed in claim 8, wherein the elastic sheet is disposed between the upper disc and the lower disc.

10. A reversible makeup brush holder, comprising:

a base, the base having a base body and a support part located at a substantially middle portion of the base body, wherein the base body is formed with a concave contour and the support part defines an accommodation hole; and an insertion seat detachably coupled to the base, the insertion seat being invertible between an upright position and an inverted position with respect to the base, the insertion seat including a disc body, the disc body having at least one insertion hole and an elastic sheet extending across the insertion hole to form at least one insertion slot for retention of an object inserted therethrough, a rotary shaft portion projecting axially from each of upper and lower surfaces of the disc body each of the rotary shaft portions being configured for rotatable insert into the accommodation hole of the support part;

the insertion seat being thereby configured to hold the object selectively in inverted or upright orientations relative to the support part.

11. The reversible makeup brush holder as claimed in claim 10, wherein the support part is integrally formed with the base body.

12. The reversible makeup brush holder as claimed in claim 10, wherein the support part includes a support post, an end of the support post has an engaging recess, the base body is provided with an engaging block, and the engaging recess of the support post is engaged with the engaging block of the base body.

13. The reversible makeup brush holder as claimed in claim 10, wherein the elastic sheet is made of silicone material.

14. The reversible makeup brush holder as claimed in claim 10, wherein the disc body includes a plurality of insertion holes in different sizes and shapes and arranged in a staggered manner.

15. The reversible makeup brush holder as claimed in claim 14, wherein insertion holes having maximum size are disposed close to a center of the insertion seat, and insertion holes having minimum size are disposed close to an outer edge of the insertion seat.

16. The reversible makeup brush holder as claimed in claim 10, wherein the disc body includes an upper disc and a lower disc.

17. The reversible makeup brush holder as claimed in claim 16, wherein the elastic sheet is disposed between the upper disc and the lower disc.

18. A reversible makeup brush holder, comprising:

a base, the base having a base body and a support part located at a substantially middle portion of the base body; and an insertion seat detachably coupled to the base, the insertion seat being invertible between an upright position and an inverted position with respect to the base, the insertion seat including a disc body, the disc body having at least one insertion hole and an elastic sheet extending across the insertion hole to form at least one insertion slot for retention of an object inserted therethrough, a rotary shaft portion projecting axially from each of upper and lower surfaces of the disc body and each rotary shaft portion defining an accommodation hole, each of the rotary shaft portions being configured for rotatable displacement with respect to the support part, wherein the support part is insertable into the accommodation hole of each rotary shaft portion;

the insertion seat being thereby configured to hold the object selectively in inverted or upright orientations relative to the support part.

19. The reversible makeup brush holder as claimed in claim 18, wherein the support part is integrally formed with the base body.

20. The reversible makeup brush holder as claimed in claim 18, wherein the support part includes a support post, an end of the support post has an engaging recess, the base body is provided with an engaging block, and the engaging recess of the support post is engaged with the engaging block of the base body.

21. The reversible makeup brush holder as claimed in claim 18, wherein an upper surface of the base body is formed with a concave contour.

22. The reversible makeup brush holder as claimed in claim 18, wherein the elastic sheet is made of silicone material.

23. The reversible makeup brush holder as claimed in claim 18, wherein the disc body includes a plurality of insertion holes in different sizes and shapes and arranged in a staggered manner.

24. The reversible makeup brush holder as claimed in claim 23, wherein insertion holes having maximum size are disposed close to a center of the insertion seat, and insertion holes having minimum size are disposed close to an outer edge of the insertion seat.

25. The reversible makeup brush holder as claimed in claim 18, wherein the disc body includes an upper disc and a lower disc.

26. The reversible makeup brush holder as claimed in claim 25, wherein the elastic sheet is disposed between the upper disc and the lower disc.

* * * * *